US007004305B2

(12) United States Patent
Schaefer

(10) Patent No.: US 7,004,305 B2
(45) Date of Patent: Feb. 28, 2006

(54) EASILY ASSEMBLABLE GRAIN BIN SWEEP

(75) Inventor: Stuart A. Schaefer, Pesotum, IL (US)

(73) Assignee: The GSI Group, Inc., Assumption, IL (US)

( * ) Notice: Subject to any disclaimer, the term of this patent is extended or adjusted under 35 U.S.C. 154(b) by 9 days.

(21) Appl. No.: 10/782,343

(22) Filed: Feb. 19, 2004

(65) Prior Publication Data

US 2005/0183931 A1    Aug. 25, 2005

(51) Int. Cl.
*B65G 33/34* (2006.01)
(52) U.S. Cl. .................... 198/674; 198/550.6; 414/310
(58) Field of Classification Search ................ 414/312, 414/311, 310, 304; 198/550.06, 861.1, 860.1, 198/674, 657, 615, 550.2, 550.01
See application file for complete search history.

(56) References Cited

U.S. PATENT DOCUMENTS 3,647,094 A * 3/1972 Jackson ...................... 198/587
4,313,705 A * 2/1982 Jackson ...................... 414/312
4,386,695 A * 6/1983 Olson ......................... 198/661
4,426,187 A * 1/1984 Olson ......................... 414/310
5,167,318 A   12/1992 Siemens
5,511,925 A * 4/1996 Muth .......................... 414/310
5,639,200 A * 6/1997 Jiskoot ........................ 414/310
5,769,590 A * 6/1998 Weikel ........................ 414/321

* cited by examiner

*Primary Examiner*—James R. Bidwell
(74) *Attorney, Agent, or Firm*—Polster, Lieder, Woodruff & Lucchesi, L.C.

(57) ABSTRACT

A grain bin sweep is adapted to be assembled within a grain bin. The sweep comprises an auger assembly including a shield and an auger; and a tractor frame assembly comprising a frame first part and a frame second part. The sweep components are sized to fit through a small access opening to a grain bin and to then be assembled together within the grain bin. Additionally, the assembly of the grain bin sweep is accomplished using simple hand tools, such as wrenches, screwdrivers, etc. No welding, drilling or other fabrication is required to assemble the parts or components together to form the sweep.

19 Claims, 9 Drawing Sheets

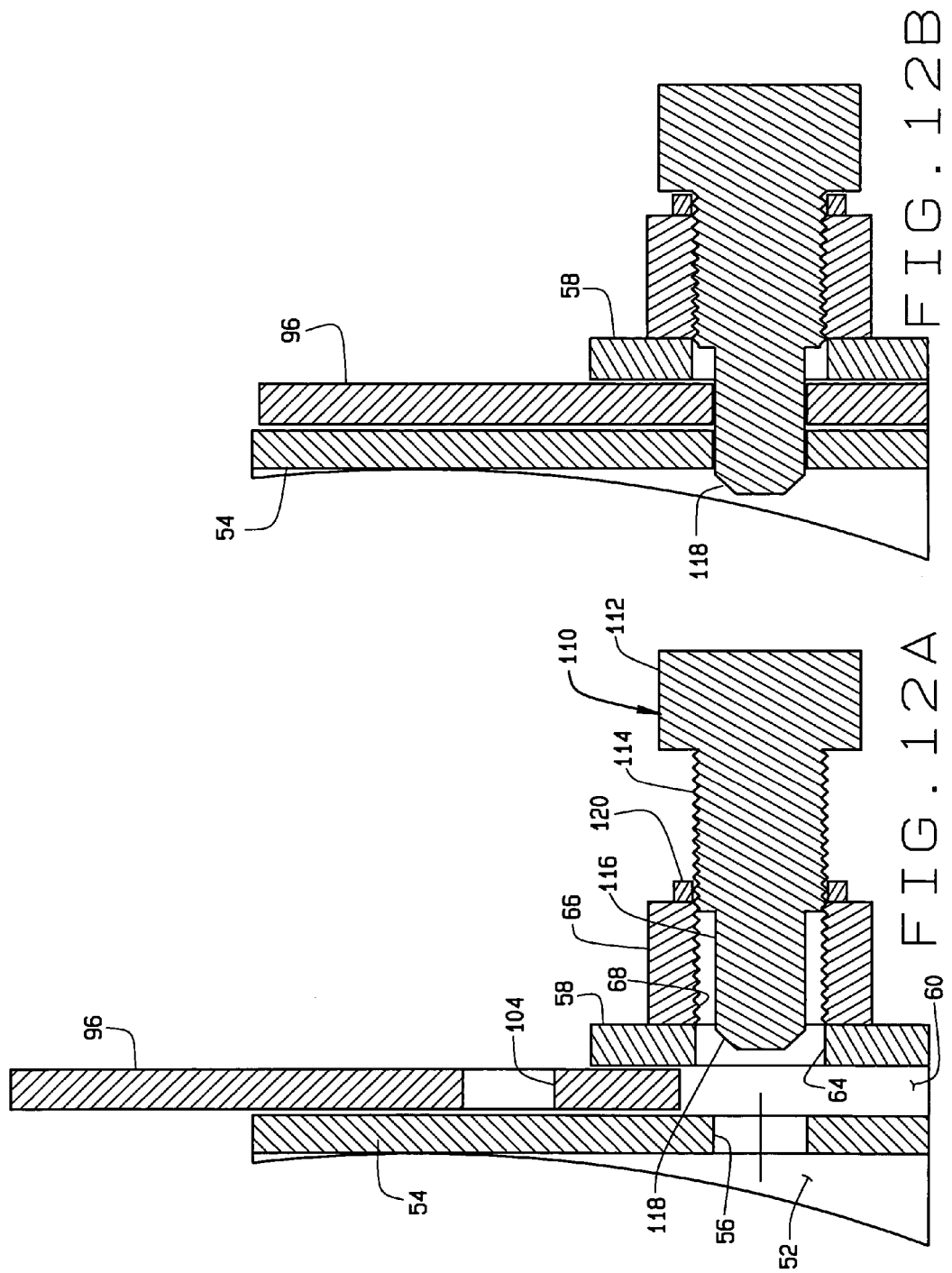

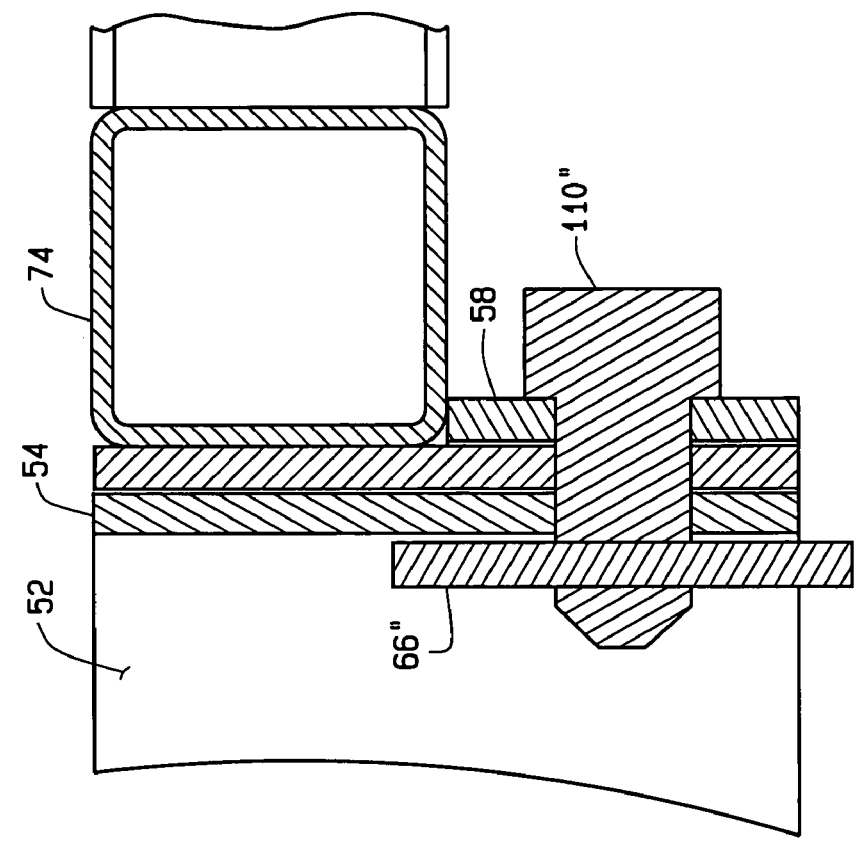
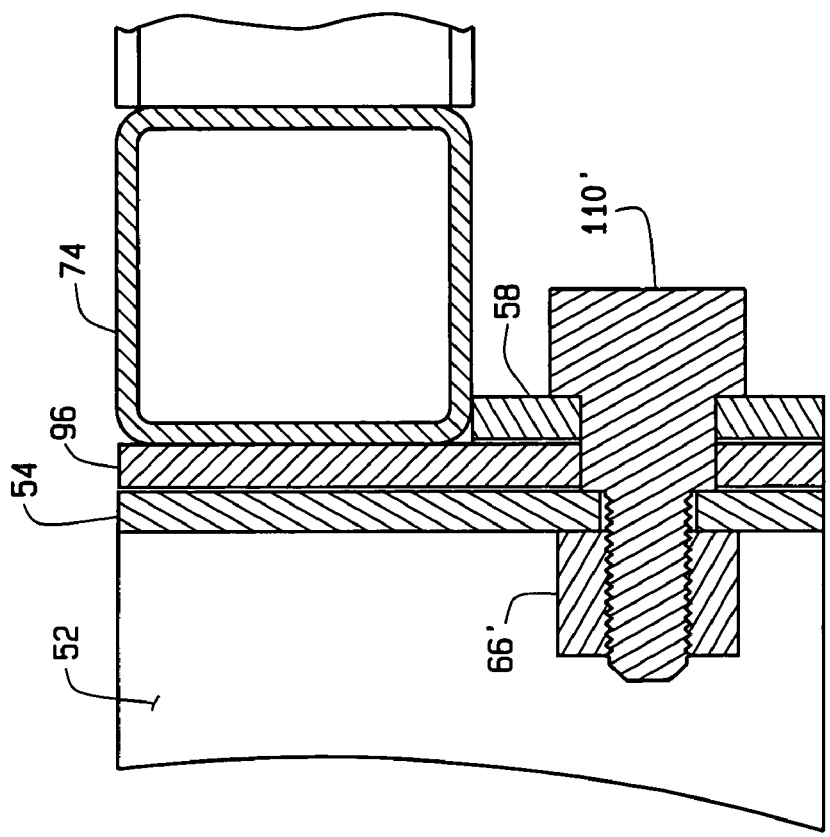

EASILY ASSEMBLABLE GRAIN BIN SWEEP

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates to grain bin sweeps, and in particular, to a sweep which can be easily assembled within a grain bin.

Grain bins are often provided with sweeps to facilitate the unloading of grain from the grain bin. During unloading, after the grain reaches a particular level within the grain bin, the grain will cease to flow readily to the grain bin's unloading outlet. Hence, assistance is required to direct the grain to the unloading outlet. Such assistance is often in the form of a grain bin sweep. As is known, a grain bin sweep typically includes an auger which extends radially from the center of the bin. The auger is turned about its horizontal axis and is driven about the grain bin to help direct the grain to the grain bin outlet.

In large grain bins (e.g., a bin having a diameter of 90'), the grain bin is commonly constructed around the sweep. However, in smaller grain bins (i.e., grain bins having a diameter of 40'), the grain sweep is installed in the grain bin after the bin is constructed. The grain sweep, as is known, includes an auger supported on a shield, a motor which drives the auger and a second, tractor motor, which moves the sweep within the bin. Often, such smaller grain bins will have limited access, and the sweep cannot be placed into the bin in an assembled condition. Rather, the sweep must be assembled within the bin.

Heretofore, there has been no commercially available high capacity grain bin sweep which can be easily assembled within the grain bin.

BRIEF SUMMARY OF THE INVENTION

A grain bin sweep of the present invention is adapted to be assembled within a grain bin. The sweep comprises an auger assembly including a shield and an auger; and a tractor frame assembly comprising a frame first part and a frame second part. The sweep components are sized to fit through a small access opening to a grain bin and to then be assembled together within the grain bin. Additionally, the assembly of the grain bin sweep is accomplished using simple hand tools, such as wrenches, pliers, screwdrivers, etc. No welding, drilling or other fabrication is required to assemble the parts or components together to form the sweep.

The grain bin sweep shield at least partially surrounds the auger and includes a plurality of first connecting members mounted to a surface of the shield. These first connecting members are preferably female connecting members and are in the form of a pocket. The pocket comprises a pair of spaced apart side plates and a back plate and a front plate. The front plate is spaced from the back plate by spacers to define an upwardly opening gap between the front and back plates. The front and back plates each include axially aligned openings. The tractor drive frame assembly includes a front support beam having second connecting members thereon which mate with the first connecting members on the shield. These second connecting members are preferably male connecting members and are in the form of tabs extending from the frame front support beam. The tabs are positioned to be aligned with the shield pockets and sized to be received in the pockets. The tab also includes openings positioned to be axially aligned with the pocket front and back plate openings when the tab is received in the pocket. A pin is provided and is sized and shaped to extend through the pocket front plate opening, the tab opening, and at least into the pocket back plate opening to maintain the tab within the pocket. The pin is retained in place in the pocket, for example, using threads on the pin which mate with threads on the front or back plates of the pocket, or by means of a securing pin (such as a lynch pin, cotter, or the like) which passes through the pin.

The pocket front plate is at least partially threaded, and the pin includes a threaded section with threads sized to mate with the threads of the pocket front plate opening. Preferably, the pocket front plate opening is larger in diameter than either the tab opening or the pocket back plate opening. To accommodate this, the pin has a first part (which includes the threads) which is received in the front plate opening, and a second smaller diameter part which is sized to extend through the tab and back plate openings.

The tractor frame assembly includes a pair of spaced apart truss sections which extend rearwardly from the front support beam and a rear support member extending between the truss sections at the backs thereof. The truss sections, and front and rear support members define an area sized to receive a tractor drive. The frame assembly, as noted includes a first, forward part and a second rear part. The first frame part includes a forward portion of the spaced apart truss sections and the second frame part includes a back portion of the spaced apart truss sections. The front and rear truss sections have forward and back members which abut each other. Fasteners are then used to connect the truss section members together to connect the frame assembly sections together.

BRIEF DESCRIPTION OF THE SEVERAL VIEWS OF THE DRAWINGS

FIG. 12A is a cross-sectional view of the pocket assembly showing the tab and pin being inserted into the pocket assembly;

FIG. 12B is a cross-sectional view similar to FIG. 12A, but with the tab and pin received in the pocket;

FIGS. 13A and 13B show alternative pins that can be used with the pocket assembly;

Corresponding reference numerals will be used throughout the several figures of the drawings.

DETAILED DESCRIPTION OF THE INVENTION

Figure 1:
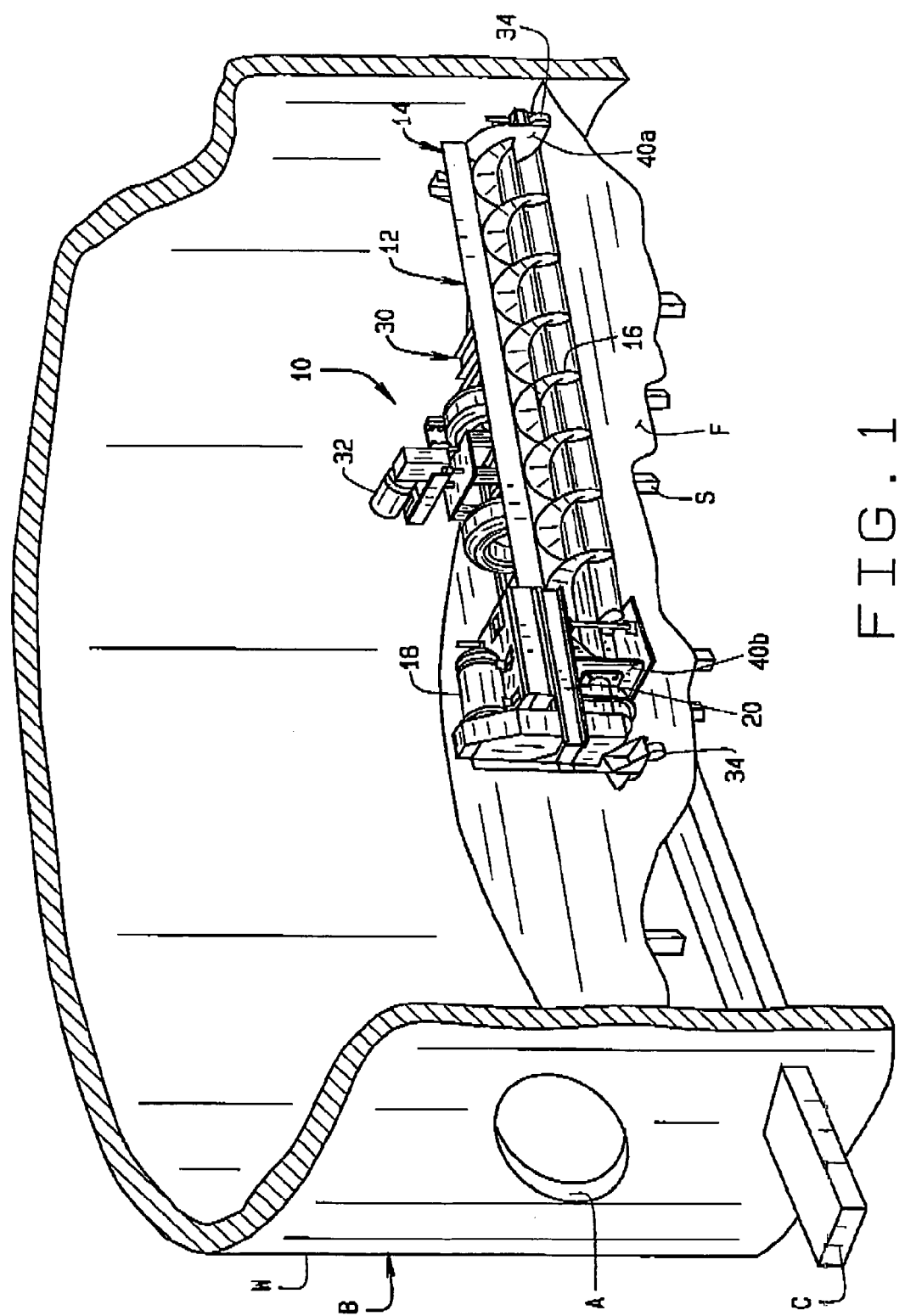
FIG. 1 is a front perspective view of a grain bin sweep of the present invention positioned within a grain bin.

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

An illustrative embodiment of a grain bin sweep 10 of the present invention is shown generally in FIG. 1 positioned within a grain bin B. As is known, the grain bin B has a wall W having an access opening A therein. An unloading conveyor C extends out through the wall W. Interiorly, the grain bin B has a floor F which is preferably supported above the ground on floor supports S. The conveyor C extends beneath the floor F to the center of the bin, where the bin includes art unloading outlet ⊔. During unloading, grain within the bin will flow to the unloading outlet ⊔ to be carried out of the bin by the conveyor C.

The sweep 10 extends from the center of the bin B and reaches substantially to the bin wall W. The sweep 10 includes an auger assembly 12 comprising a shield 14 which partially surrounds and rotatably supports an auger 16. The auger 16 is driven by a screw drive 18 which is mounted on a motor table 20. A frame assembly 30 is mounted to the rear of the shield 14 to maintain a tractor drive 32 in place relative to the shield. Wheels 34 are provided at either end of the sweep 10 to enable movement of the sweep over the grain bin floor F.

The bin B, as noted, includes an access opening A. This opening, in smaller bins is limited. The opening can be as small as 20"×24" if rectangular, or 30½" in diameter if round. In a 40' diameter bin, the sweep assembly 12, with its motor mount 20 can be about 19" wide and the frame assembly 30 can be another 30"–40" wide. Hence, the sweep 10 would have a largest width of nearly 60". As can be appreciated, this is too wide to fit through a 24" or 30½" opening. Hence, the components of the sweep 10 must be separately placed into the bin, and then the sweep is assembled in the bin. As will become apparent from the description below, the sweep 10 of the present invention provides a structure which allows for quick and easy connection or assembly of the sweep 10 within the bin using simple hand tools. No welding, grinding, drilling, or other type of fabrication is required to assemble the sweep 10 within the grain bin B.

The auger assembly 12 is shown in more detail in FIGS. 2–6. The auger assembly 12 includes the shield 14. The shield 14 includes end plates 40a,b having bearings or journals 41 to rotatably support the auger 16. The shield 14 is mounted to the end plates 40a,b and includes a first portion 14a which defines an arc to partially enclose the auger. The arc defined by the shield plate is open at the front, as seen in FIG. 1, so that the sweep may move grain by the action of the rotating auger, as is known in the art. A generally vertical portion 14b extends substantially the length of the curved portion 14a, and is supported at an end adjacent the screw drive motor table 20 by a plate 46, shown in FIGS. 4 and 5, to be triangular.

Figure 2:
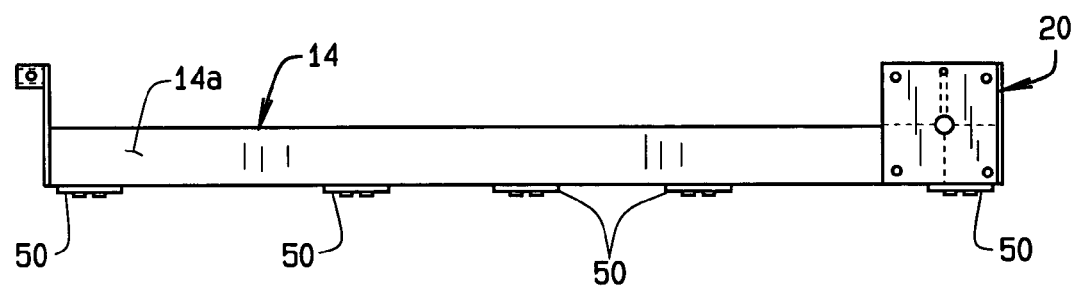
FIG. 2 is a top plan view of a shield of the grain bin sweep.
Figure 3:
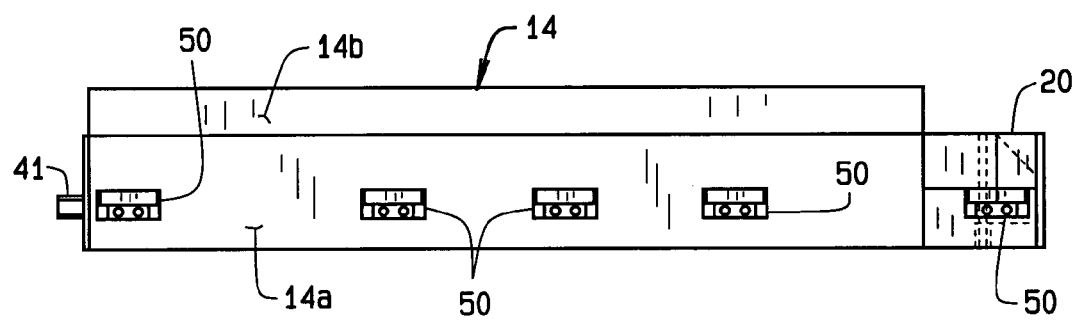
FIG. 3 is a back elevational view of the shield.
Figure 4:
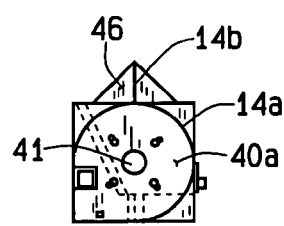
FIG. 4 is a right elevational view of the shield.
Figure 5:
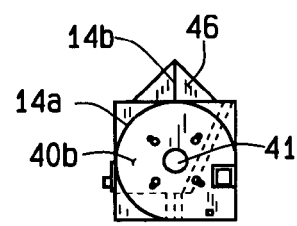
FIG. 5 is a left elevational view of the shield.
Figure 6:
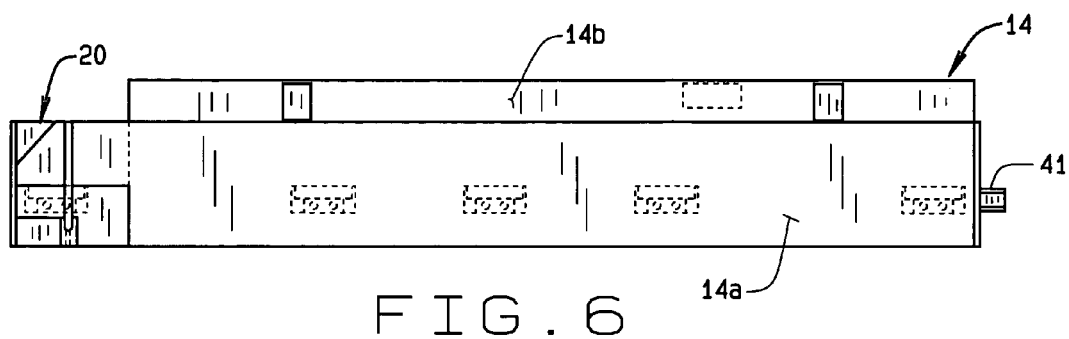
FIG. 6 is a front elevational view of the shield.

Importantly, the shield 14 is provided with a plurality of connecting members 50 mounted to the shield along the back surface thereof. The connecting members 50 are preferably female connecting members in the form of pocket assemblies or brackets 50. Five pocket assemblies 50 are shown in FIGS. 2 and 3, although more or fewer could be provided. The pocket assemblies 50 are positioned on the shield 14 to be at the same height as the auger axle (or at the same height as the shield assembly journals or bearings which support the auger). The pocket assemblies 50 can be fixed to the shield using any conventional method.

Figure 7:
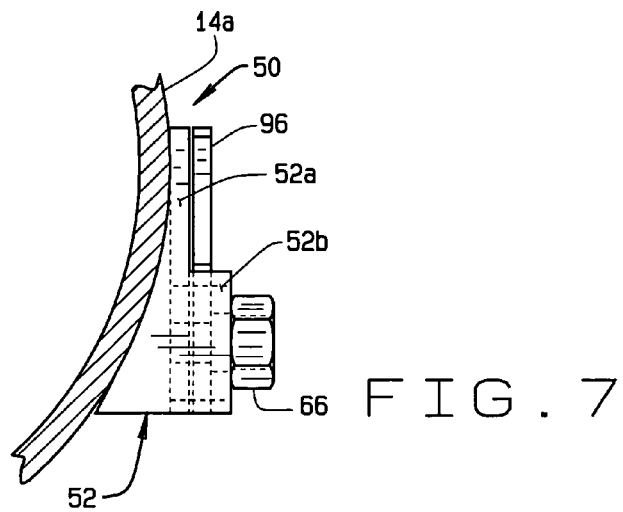
FIG. 7 is a side elevational view of a shield mounted connecting member in the form of a pocket assembly with a frame mounted connecting assembly in the form of a tab received therein.
Figure 8:
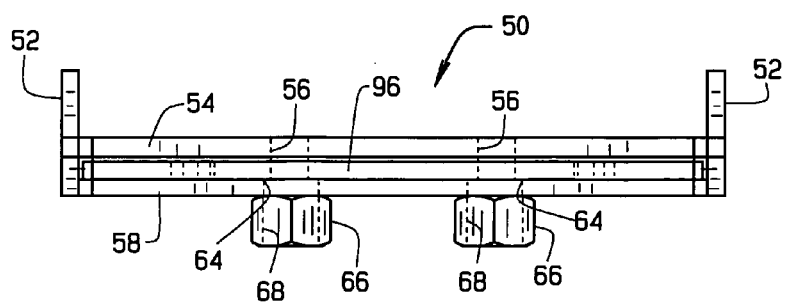
FIG. 8 is a top plan view of the pocket assembly with the tab received therein.
Figure 9:
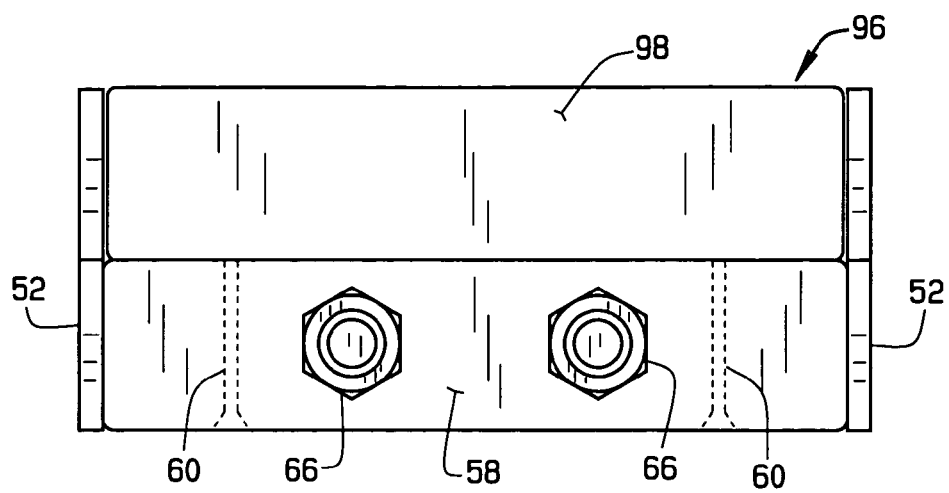
FIG. 9 is a front elevational view of pocket assembly with the tab received therein.
Figure 10:
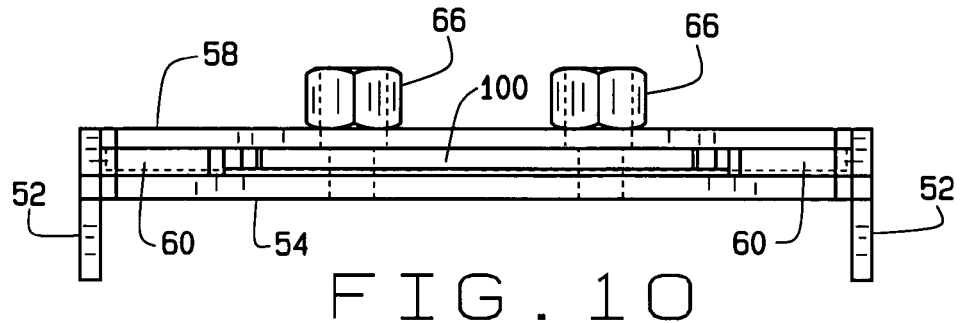
FIG. 10 is a bottom plan view of the pocket assembly with the tab received therein
Figure 11:
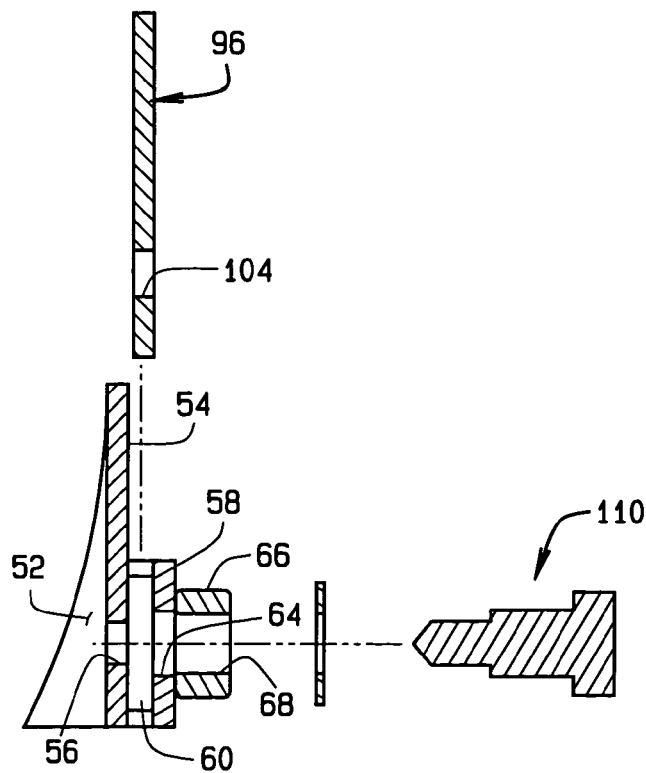
FIG. 11 is an exploded cross-sectional view of the pocket assembly and tab.
Figure 14:
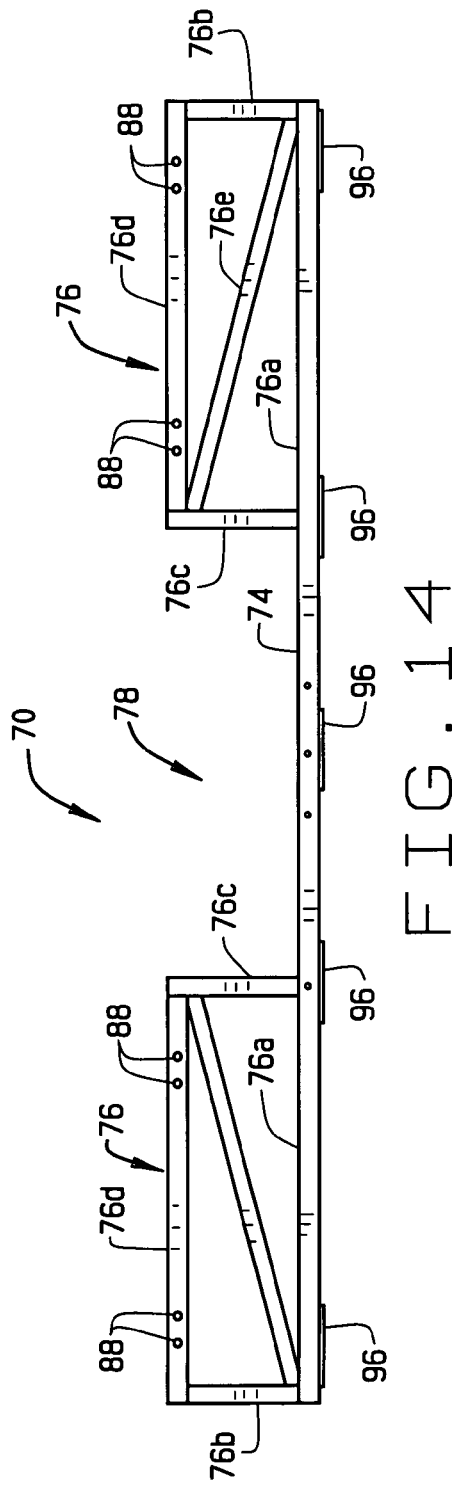
FIGS. 14–16 are top plan, front elevational, and side elevational views of a front section of the frame assembly of the sweep.
Figure 15:
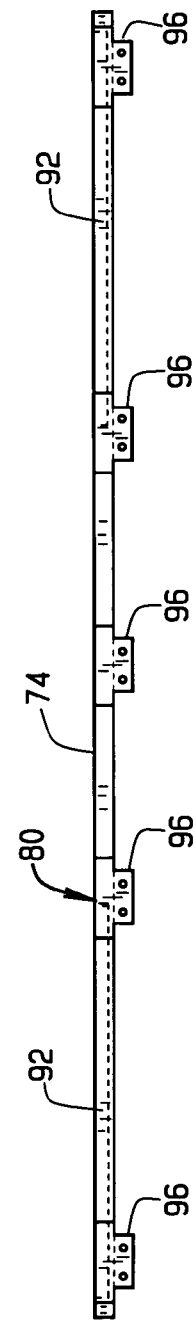
Figure 16:
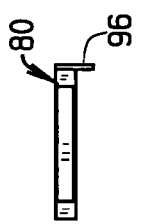
Figure 17:
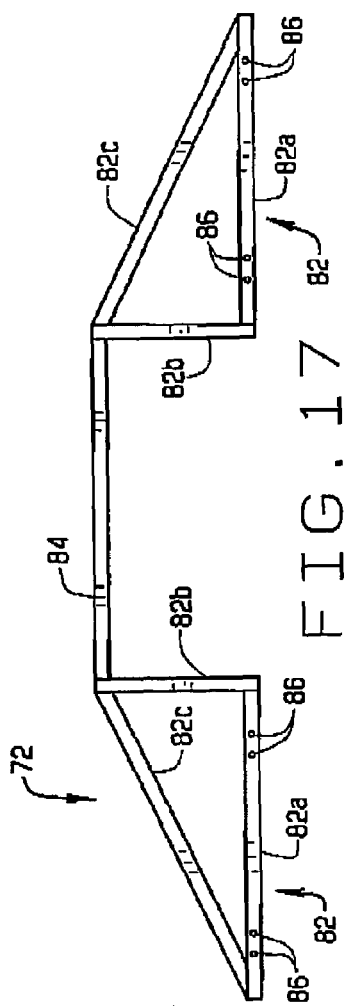
FIGS. 17 and 18 are top plan and front elevational views of a back section of the frame assembly of the sweep.
Figure 18:
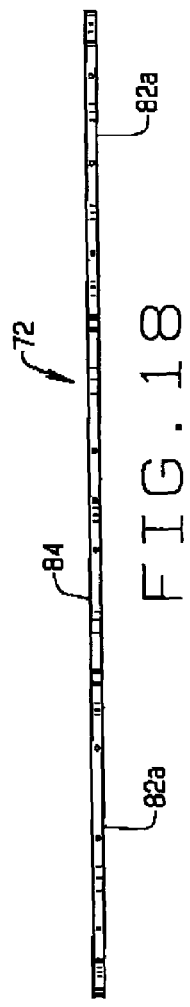

The pocket assemblies 50 are shown in more detail in FIGS. 7–11. The pocket assemblies include a pair of side plates 52, which have a back edge that is curved to match the curvature of the back of the shield plate 42, as seen in FIG. 7. The side plates 52 have a top portion 52a, and a bottom portion 52b. The bottom portion 52b is wider than the top portion 52a, and has a height equal to about one-half the height of the plate 52. A back plate 54 extends between the two side plates 52. As seen in FIGS. 7 and 11, at the top of the side plate 52, the side plate and the back plate are of approximately equal width. However, the side plate is wider at its bottom, than the back plate 54, and hence, supports the bottom of the back plate in a spaced relationship from the shield 14. A pair of spaced apart openings 56 extends through the back plate 54. The two openings lie on the same plane, and are spaced apart to divide the back plate 54 approximately into thirds.

A front plate 58 extends between the side plates 52 spaced forwardly of the back plate 54. The front surface of the front plate 58 is generally flush with the front edge of the side plate lower portion 52b. The front plate 58 has a height equal to about one-half the height of the back plate 54. The front plate 58 is spaced from the back plate 54 by a pair of spacing plates or bars 60 to define a gap or pocket 62 which is open at both the top and the bottom of the assembly 50. Should grain lodge in the pocket gap 62, the grain can then fall through the gap. The spacing plates 60 have a height equal to the height of the front plate 58 and extend inwardly from the side plates 52. As will become apparent below, the upper surfaces of the spacing plates 60, the front plate 58 and the forward portion 52b of the side plates will support at least a part of the weight of the frame 30. To support this weight, the spacing plates 60 preferably have a side-to-side width of about 10% to about 20% of the side-to-side length of the front and back plates 54 and 58. The front plate 58 is provided with a pair of openings 64 which are aligned with the back plate openings 50, but are larger in diameter than the back plate openings.

Lastly, nuts 66 defining threaded openings 68 are fixed to the front plate over the openings 64. The threaded openings 68 have the same nominal diameter as the openings 64. Rather than welding a nut to the front plate 58, the front plate could be provided with an area of increased width, in which the opening 68 is provided. Inasmuch as the opening 68 is essentially a continuation of the opening 64, a single combined opening would be provided, and this combined opening could be completely threaded, or only partially threaded.

The frame assembly 30 is shown in more detail in FIGS. 14–19. The frame assembly 30 includes a forward portion 70 which is mounted to the shield and a rear portion 72 which is mounted to the frame forward portion 70. The frame forward portion 70 includes a support beam 74 which extends the length of the shield 14. The support beam 74 is preferably formed from square tubing. A pair of boxes 76 extends rearwardly from the support beam 74. The boxes 76 have a front 76a, an outer side 76b, an inner side 76c, and a back 76d. A diagonal member 76e extends from the inner back corner to the outer front corner of the boxes. The box front 76a is defined by the support beam 72. The remaining members 76b–e of the boxes 76 are formed from square tubing similar to the tubing used to form the support beam 74. The two boxes 76 are spaced apart to define a space or gap 78 sized to receive the tractor drive 32. A stud 80 extends upwardly from the beam 74 approximately at an intersection of an inner leg 76c of one of the boxes 76 with the beam 74. The stud 80 is provided to secure electrical conduit in place.

The frame assembly back section 72 (FIGS. 17–18) includes two spaced apart right triangle sections 82 with a connecting member 84 extending therebetween. The sections 82 each include a base member 82a, a leg member 82b, and a hypotenuse member 82c. The triangle members 82 are spaced apart a distance equal to the spacing between the box members 76 of the frame forward portion 70. The frame members 82a–c and 84 are each made from the same square tubing, as are the members of the frame assembly forward section 70.

The frame rear section 72 is connected to the frame forward section 70 to form the frame 30. When connected, the base members 82a of the frame rear section 72 abut the back members 76d of the forward frame member boxes 76. As seen, the triangle portion base members 82a and the box portion back members 76d are of substantially the same length. The triangle portion leg members 82b extend from the box portion side members 76c, such that the members 82b and 76c form a continuous frame section. The back frame assembly members 82a and the forward frame assembly members 76d include aligned vertical openings 86 and 88, respectively, on their top surfaces and aligned horizontal openings 90 and 92, respectively, on their side surfaces. The openings 90 and 92 are coaxial, and receive a fastener, such as a bolt, to secure the frame sections 70 and 72 together. A plate extends over the top surface of the frame members and fasteners, such as bolts, are passed through the plate and the vertical openings 86 and 88.

Figure 19:
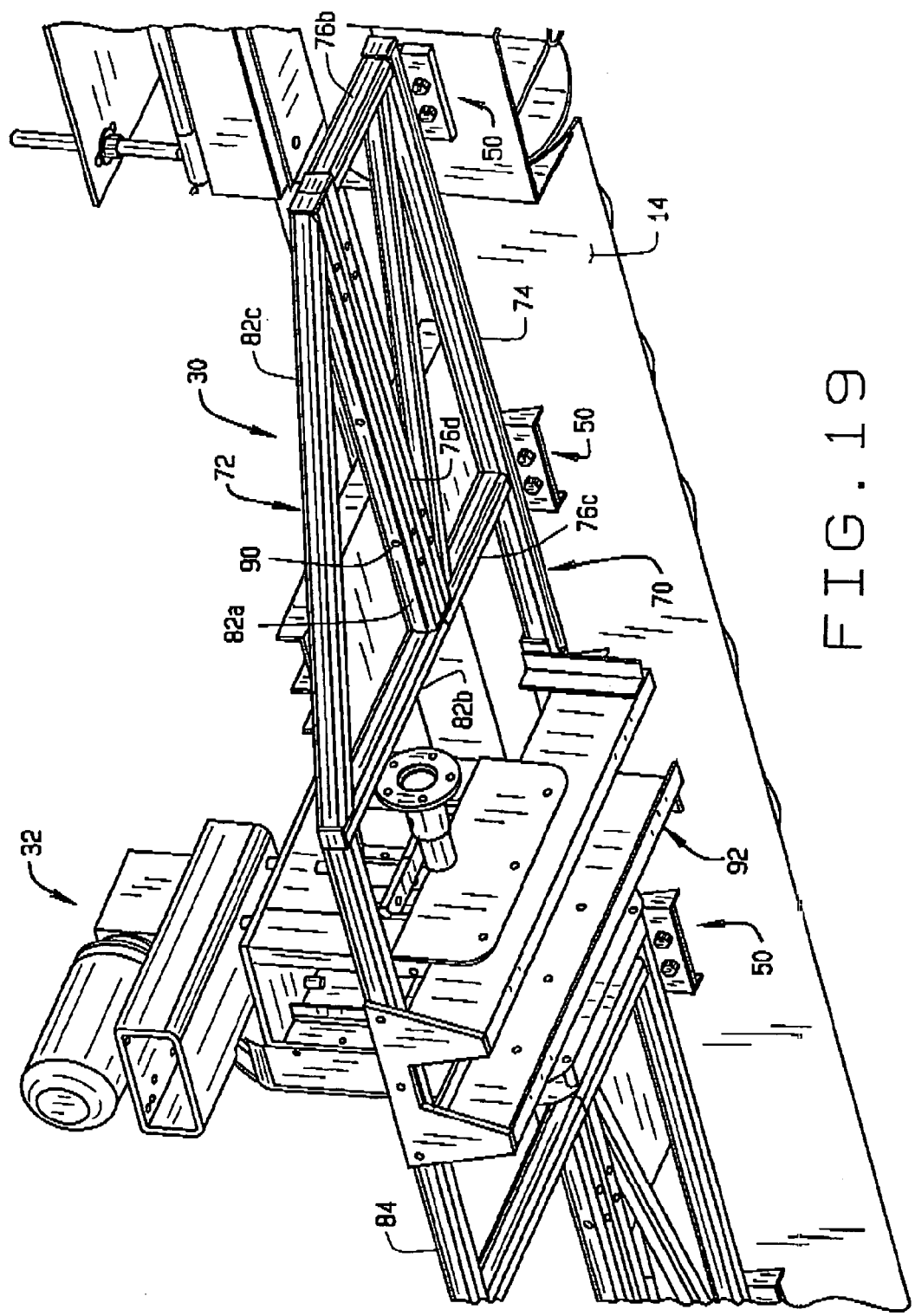
FIG. 19 is a rear, bottom perspective view of the sweep assembly, showing the frame mounted to the sweep shield utilizing the tabs and pockets.

As seen in FIG. 19, the frame members 74, 76c, 82b, and 84 define an enclosed area sized and shaped to receive the tractor drive 32. A motor mounting bracket 92 extends through the enclosed area between the frame back section member and the frame front section support beam 74. The tractor drive 32 is then mounted to the bracket 92.

A plurality of connecting members 96 are positioned along the frame support beam 74. The connecting members 96 are sized and shaped to mate with the connecting members 50 on the shield. The connecting members 96 are male connecting members and are in the form of tabs 96. As will be described below, the tabs are received in the pocket assemblies to fix the frame assembly 32 to the shield 14. Hence, the number of tabs 96 is equal to the number of pocket assemblies 50, and the tabs 96 are positioned on the support beam 74 to be aligned with and received in the pocket assemblies. The tabs can be secured to the support beam 74 in any conventional manner. For example, the tabs can be welded, bolted, or riveted to the support beam 74.

Figure 20:
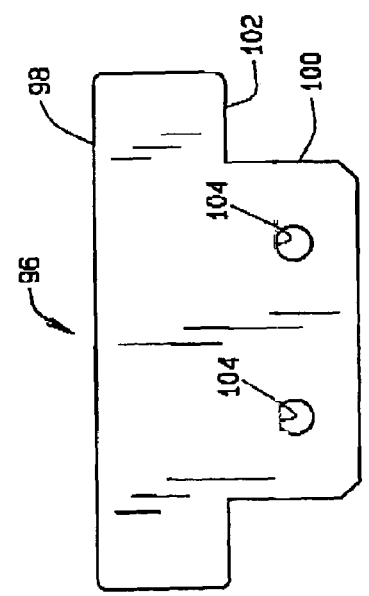
FIG. 20 is a front elevational view of a tab of the frame assembly.

A tab 96 is shown in FIG. 20. The tab 96 includes an upper portion 98 and a tongue 100 generally centered with respect to the upper portion 98. The bottom outer corners of the tongue 100 are preferably chamfered. The upper portion 98 has a width greater than the width of the tongue, and the tab 96 thus includes a pair of opposite shoulders 102. The tab has a depth which is slightly less than the depth of the pocket or gap 62 so that the tab tongue can slidingly be received in the pocket gap 62. The tab has a height, from the bottom of the tongue to the top of the shoulders, approximately equal to the height of the pocket back plate 54. The width of the tab from shoulder-to-shoulder is slightly less than the width of the pocket plates 54 and 58, to allow for the tab to be received between the pocket assembly side plates 52. The tab tongue has a height approximately equal to the height of the pocket front plate 58 and a width slightly less than the distance between the inner edges of the pocket assembly spacer plates 62. Lastly, the tab 96 is provided with a pair of openings 104 on the tongue 100 which are positioned to be aligned with the openings 58, 64, and 68 in the pocket assembly back plate, front plate, and nut, respectively. The tab openings 104 have a diameter approximately equal to the diameter of the pocket back plate openings 58, and which are smaller in diameter than the front plate and nut openings 64 and 68.

As can be appreciated, to mount the frame 30 to the shield 14, the frame tabs 96 are aligned with the shield pockets 50, and the tabs are dropped into the pockets. When the tabs 50 are dropped into the pockets, the tab shoulders 102 will rest on the pocket spacer plates 60 to be supported thereby. Hence, the spacer plates 60 will bear the load of frame assembly 30. The bottom of the support beam 74 may also rest on the upper surfaces of the pocket front plate 58 and the pocket side plates 52. In this instance, the pocket front plate 58 and the pocket side plates 52 will also support some of the weight of the frame. Pins 110 are provided to fix the frame assembly in place.

Figure 21:
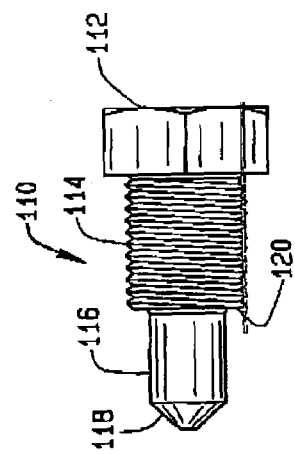
FIG. 21 is a side elevational view of a pin used to maintain the tab in the pocket assembly.

The pins 110, which are shown in more detail in FIG. 21, include a head 102, a threaded portion 114, and a narrower portion 116 having a tapered end 118. The pin 110 forms a shoulder 120 where the diameter is stepped down between the portions 114 and 116. The head 112 is shaped to be driven, for example, by a wrench, screw driver, etc. The pin's threaded portion 114 has threads which mate with the threads of the nut 66 (i.e., the threads of the opening 68 mate with the threads of the fastener portion 94). The portion 114 has a length less than the combined depth of the nut 66 and front plate 58. The pin portion 116 has a diameter sized to pass through the tab opening 104 and the pocket back plate opening 58, and a length slightly greater than the combined depth of the tab and the pocket back plate.

When the pin 110 is inserted in the aligned openings of the tab and pocket plates and tightened, the pin shoulder 120 will be positioned within the front plate opening 64. The pin section 116, however, will pass through the tab opening and into the pocket back plate opening, thereby providing a pin connection of the tab in the pocket. The pin 110 may extend beyond the back surface of the back plate 54, as seen in FIG. 12B. However, the side plates 52 space the pocket back plates 54 from the shield 14, as seen in FIG. 7, at the level of the pin 110, and hence, the pin 110 will not contact the shield 14.

The threaded connection between the pin 110 and pocket is provided to secure the pin 110 in place relative to the pocket assembly to prevent the pin 110 from slipping out of the pocket assembly. Preferably, when the pin is secured in the pocket, the alignment of the pin with the pocket and tab openings, and the alignment of the pocket and tab openings reduce, or even eliminate, any shear forces exerted on the pin by the tab. Securing of the pin 110 can be accomplished in other ways. For example, as seen in FIG. 13A, the back plate 54 and the distal end of the pin 110' can be threaded by mounting a nut 66' to the back surface of the back plate, such that the pin 54 screws into the pocket back plate, rather than the pocket front plate 58. In this instance, the pin shoulder 120 may engage the tab 96 to urge the tab against the pocket back plate 54. This would place at least the forward section 116 of the pin 110 in tension. Alternatively, as seen in FIG. 13B, the pin 110' could be lengthened and a fastening pin 66', such as a lynch pin, cotter pin, or the like to be passed through the distal end of the pin, between the pocket back plate 54 and the shield 14 to maintain the pin 110 in the pocket assembly. As seen in this second alternative, the pin 110' has a shaft of substantially constant diameter, and the openings in the pocket front and back plates and in the tab are all also of substantially the same diameter.

In view of the above, it will be seen that the construction of the sweep assembly 10 provides for a sweep assembly which can be easily assembled within a bin using only simple hand tools. In fact, assembly of the illustrated embodiment requires only that several bolts be tightened. The sweep 10 includes 4 major sections: the auger assembly 12 (including the auger drive 18), the frame front section 70, the frame rear section 72, the tractor drive 32 and its bracket 92. These sections of the sweep all have a dimension which will allow for the sections to be inserted into the bin through the bin access opening A. Once the components or sections are placed within the bin B, the components can be assembled as follows: the front and rear sections 70 and 72 of the frame 30 can be connected as described above, and then the tractor drive 32 can be mounted to the frame assembly 30. The frame 30 can then be connected to the shield 14 as described above. Of course, the order in which the various components of the sweep are assembled can be changed as desired.

Although the tabs 96 are shown mounted to the frame assembly 30 and the pockets 50 are shown mounted to the shield 14, they could be reversed, such that the tabs 96 are mounted to the shield 14 and the pockets 50 are mounted to the frame assembly 30. Alternatives to the pocket and tab which are shown and described above can be employed. For example, the pocket can be replaced with a generally U-shaped bracket. The tab would then become a tongue which extends into the bracket. In this instance, the U-shaped bracket would include horizontally extending upper and lower surfaces and a back surface being mounted to the shield or frame support member. The bracket would thus open towards the frame or the shield, depending on which of the two it is fixed. The tongue would be received in the U-shaped bracket, and a connecting pin would extend vertically through the upper and lower surfaces of the bracket and through the tongue. A securing pin (such as a lynch pin, cotter pin, or the like) could extend through the end of the connecting pin to prevent the connecting pin from coming out of the two connecting members.

In another alternative, the pocket can be replaced with a hollow tube and the tab would be replaced with a post sized and shaped to be received in the tab. A connecting pin would be passed through the tube and post to prevent the post from exiting the tube and a securing pin could be used to maintain the connecting pin in place. In this embodiment, the connecting pin can be replaced by, or supplemented with, spring-mounted members (e.g., balls) on one of the tube or post which are received in pockets or openings in the other of the tube or post. These ball and pocket connection would allow for a snap-type fit between the tube and post. The tube and post could be horizontally extending members, however, they could also be vertically extending members.

As a third alternative, the first and second connecting members 50 and 96 can be replaced with a post on either the frame or the shield which is threaded either externally or internally. A rotatable coupler would be mounted on the other of the frame and shield and would be threaded, such that a threaded connection would be provided between the shield and the frame. To ensure that the coupler does not disconnect from the threaded post, a connector pin can be passed through the coupler and threaded post.

As various changes could be made in the above constructions without departing from the scope of the invention, it is intended that all matter contained in the above description or shown in the accompanying drawings shall be interpreted as illustrative and not in a limiting sense. The pocket gap 62 is shown to be open at its top. Although less desirable, the gap could also be opened along one of the sides, and the frame tabs 84 could then be mounted to the frame assembly support beam 74 in such a way that the tabs are slid horizontally into the pockets, rather than vertically. Alternatively, the tabs could be formed directly into the support beam 74, such that the tabs extend downwardly from the forward surface of the support beam. In this instance, the front surface of the tab would be flush with the front surface of the support beam, and the support beam 74 would rest directly on the pocket assembly spacer plates 60. Although not preferred, the pocket assembly back plate could be defined by the rear surface of the shield 14. The threaded section 114 of the pin 110 could be lengthened such that the pin shoulder 120 engages the tab 96 and urges that tab against the pocket back plate 54. Alternatively, if the shoulder will not engage the tab, the pin could be of substantially uniform diameter. Rather than using a plurality of pockets, one elongate pocket could be provided, and the frame could be provided with either one elongate tab, or a plurality of tabs, which are received in the single elongate pocket. These examples are merely illustrative.

What is claimed is:

1. A grain bin sweep comprising:
   an auger assembly including an auger, a shield which at least partially surrounds said auger, an auger driver adjacent said shield and operatively connected to said auger to drive said auger, and a first connecting member mounted to the back surface of shield;
   a tractor drive frame assembly comprising a first frame portion and a second frame portion; said first and second frame portions each comprising an edge member; the edge members of said first and second frame portions being positioned adjacent each other; said first and second frame portions being connected to each other along their adjacent edge members, the frame assembly defining a tractor drive receiving area;

a second connecting member mounted to a forward end of one of the first and second frame portions; said second connecting members being matable with said first connecting member to connect the frame to the shield; and a tractor drive received in said tractor drive receiving area.

2. The grain bin sweep of claim 1 wherein one of said first and second connecting members comprises an opening and the other of said first and second connecting members is received in said opening.

3. The grain bin sweep of claim 2 and further including a connecting pin which passes through at least one surface of said first connecting member and at least into said second connecting member to prevent said first and second connecting members from becoming disconnected.

4. The grain bin sweep of claim 2 wherein said first connecting member comprises at least two spaced apart surfaces defining a gap therebetween; said second connecting member comprising a tab sized and shaped to be received in said gap.

5. The grain bin sweep of claim 4 wherein the gap opens upwardly, and the tab extends downwardly.

6. The grain bin sweep of claim 2 wherein the first connecting member comprises a back plate and a front plate, the front plate being spaced from the back plate by spacers, the front and back plates each including axially aligned openings; the second connecting member being received between said front and back plates of said first connecting member and including openings positioned to be axially aligned with the front and back plate openings of the first connecting member when the second connecting member is received between the first connecting member front and back plates; the sweep further including a pin sized and shaped to extend through the front plate opening, the opening of the second connecting member, and at least into the back plate opening.

7. The grain bin sweep of claim 6 wherein the front plate opening has a diameter greater than the back plate opening and the tab opening.

8. The grain bin sweep of claim 7 wherein the pin includes a first section sized to be received in the front plate opening and a second section sized to be received in the back plate opening; the pin second section being smaller in diameter than the pin first section, the pin defining a shoulder between its first and second sections, said shoulder having an outer diameter greater than the diameter of said tab opening.

9. The grain bin sweep of claim 8 wherein at least a portion of the front plate opening is threaded, the pin including first section being at least partially threaded to be threadedly received in the pocket front plate opening.

10. The grain bin sweep of claim 7 wherein said first connecting member includes a pair of opposed side plates, said shield being curved and said side plates having a back surface shaped complimentarily to the curvature of the shield.

11. The grain bin sweep of claim 1, wherein said first frame portion includes spaced apart truss sections; said first frame portion defining a pair of spaced apart rectangles and said second frame portion including spaced apart truss sections; said second frame portion truss sections defining a pair of spaced apart triangles; said first frame portion truss section including a back member and said second frame portion truss section having a forward member; said truss portion members being connected together to connect said second frame portion to said first frame portion.

12. The grain bin sweep of claim 11 including fasteners which extend through said frame truss portion members to conned said frame first and second sections together.

13. A grain bin sweep comprising:

an auger assembly comprising a shield which at least partially surrounds an auger; and a tractor drive frame assembly, the frame assembly comprising a front support beam, a pair of spaced apart truss sections, and rear support member extending between the truss sections; the truss sections, and front and rear support members defining an area sized to receive a tractor drive;

a plurality of pocket members mounted to one of said shield and said frame; said pocket members each including a first pair of spaced apart plates to define a gap between the front and back pocket plates; and tabs extending from the other of said shield and said frame; the tabs being positioned to be aligned with the pockets and sized to be received in the pockets.

14. The grain bin sweep of claim 13 wherein pockets are mounted to said shield; said pockets including side plates having a surface shaped complimentarily to the shape of the shield surface, said side plates being shaped to maintain said pockets in a generally vertical orientation such that said gap opens upwardly.

15. The grain bin sweep of claim 13 wherein said pocket includes an opening in at least a first plate of the fist pair of plates and said tab including an opening positioned to be aligned with said plate opening when said tab is received in said pocket gap; said grain bin sweep further including a pin which extends through said pocket plate opening and said tab opening.

16. The grain bin sweep of claim 15 wherein said pocket includes an opening in the second plate of said first pair of plates; said pin extending at least into said second plate opening.

17. The grain bin sweep of claim 16 wherein the opening of at least one of said plates of said first pair of plates is at least partially threaded, said pin including thread on a portion thereof sized and shaped to be threaded into said plate opening threaded portion.

18. The grain bin sweep of claim 17 wherein the threaded portion of said plate opening is defined by a nut fixed to front plate.

19. A grain bin sweep adapted to be assembled within a grain bin, the sweep comprising:

an auger assembly including a shield and an auger;

a tractor frame assembly connectable to said shield; said tractor frame assembly comprising a frame first part and a frame second part;

a first connecting member on said auger assembly and a second connecting member on said frame assembly; said first and second connecting members being matable together wherein, the sweep components are sized to fit through a small access opening to a grain bin, and wherein said first and second connecting members allow for the connection of said frame assembly to said auger assembly using only hand tools.

\* \* \* \* \*

UNITED STATES PATENT AND TRADEMARK OFFICE
CERTIFICATE OF CORRECTION

PATENT NO. : 7,004,305 B2
DATED : February 28, 2006
INVENTOR(S) : Stuart A. Schaefer It is certified that error appears in the above-identified patent and that said Letters Patent is hereby corrected as shown below:

<u>Column 10,</u>
Line 5, replace "conned" with -- connect --.

Signed and Sealed this

Thirtieth Day of May, 2006

JON W. DUDAS
*Director of the United States Patent and Trademark Office*